(12) United States Patent
Kim (10) Patent No.: US 6,501,642 B2
(45) Date of Patent: Dec. 31, 2002

(54) STRUCTURE FOR PREVENTING WIRES FROM BEING DAMAGED

(75) Inventor: Young-Su Kim, Kyoungsangbuk-do (KR)

(73) Assignee: LG. Philips LCD Co., Ltd, Seoul (KR)

( * ) Notice: Subject to any disclaimer, the term of this patent is extended or adjusted under 35 U.S.C. 154(b) by 0 days.

(21) Appl. No.: 09/825,951

(22) Filed: Apr. 5, 2001

(65) Prior Publication Data

US 2002/0034064 A1 Mar. 21, 2002

(30) Foreign Application Priority Data

Apr. 7, 2000 (KR) ............................................. 00-18337

(51) Int. Cl.[7] ................................................ G06F 1/16
(52) U.S. Cl. ........................ 361/681; 361/684; 439/492; 362/224
(58) Field of Search ................................. 361/681, 686, 361/724–727, 684–685; 439/492; 248/917–919, 921–923; 345/905; 312/223.1–223.2; 362/224–225

(56) References Cited

U.S. PATENT DOCUMENTS

| | | | | |
|---|---|---|---|---|
| 5,225,801 A | * | 7/1993 | Ida et al. ......................... | 336/96 |
| 5,844,775 A | * | 12/1998 | Lundberg ..................... | 361/683 |
| 6,330,148 B1 | * | 12/2001 | Won et al. .................... | 361/681 |

* cited by examiner

Primary Examiner—Darren Schuberg
Assistant Examiner—Hung Van Duong
(74) Attorney, Agent, or Firm—McKenna Long & Aldridge LLP (57) ABSTRACT

A display module having both a wire holder that holds lead wires for the display module and a rib that is aligned with the wire holder. The wire holder is coupled to a bottom cover using a protrusion on the bottom cover that mates to a slit in the wire holder. The rib extends from one side portion of a main frame and contacts the wire holder when the display module is assembled. The wire holder and the rib prevent the wire from directly contacting a top frame and a bottom cover, and also increase the flexibility of the wires in the display module. Thus, the wire holder and rib reduce or prevents wire damage.

45 Claims, 9 Drawing Sheets

STRUCTURE FOR PREVENTING WIRES FROM BEING DAMAGED

CROSS REFERENCE TO RELATED APPLICATIONS

This application claims the benefit of Korean Patent Application No. 2000-18337, filed on Apr. 7, 2000, which is hereby incorporated by reference.

BACKGROUND OF THE INVENTION

1. Field of the Invention

The present invention relates to display devices. More particularly, it relates to protecting the wires of a display back-light device.

2. Description of the Related Art

There are many types of flat panel display devices available, including plasma display panels (PDP), field emission displays (FED), and the widely used liquid crystal display (LCD). While the principles of the present invention are generally applicable to all such displays, it will be discussed with respect to a LCD that is used in a portable computer.

Figure 1:
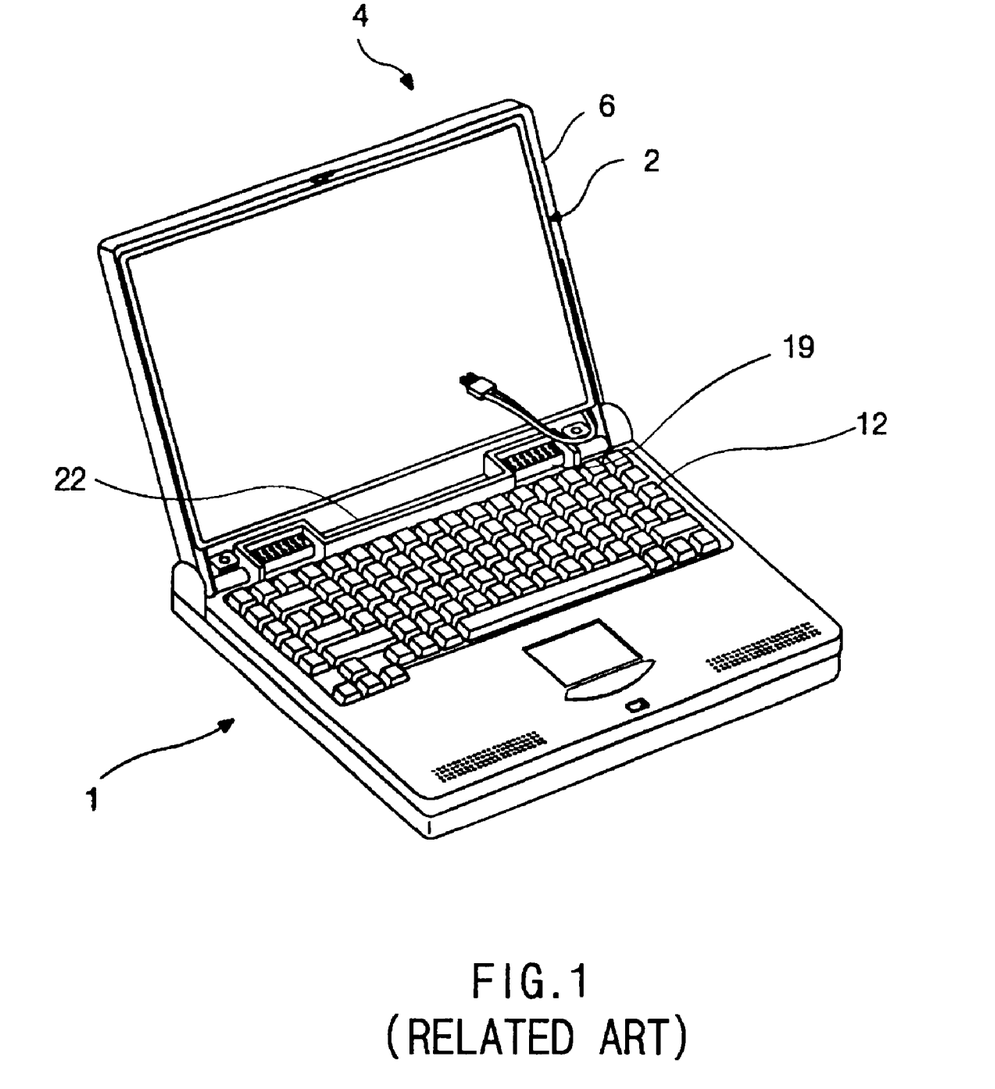
FIG. 1 is a perspective view of a portable computer.

Referring now to FIG. 1, a general portable computer typically includes a system body 1 and a liquid crystal display (LCD) device assembly 4 that is coupled to the system body 1 via a hinge mechanism 19. Thus, the general portable computer includes one case connected to another case using a hinge. The liquid crystal display device assembly 4 has a liquid crystal display module 2 and a case 6 that supports the module 2. The system body 1 includes an input device 12 such as a keyboard.

The case 6 has a top portion and a bottom portion. A back-light device having an illuminating section (reference the subsequent discussion related to FIG. 2) is included in the liquid crystal display module 2. An inverter power supply circuit 22 for driving a lamp (not shown in FIG. 1) in the back-light device, usually either a cold cathode fluorescent lamp or a hot cathode fluorescent lamps, is installed in either the liquid crystal display module 2 or in the system body 1.

Figure 2:
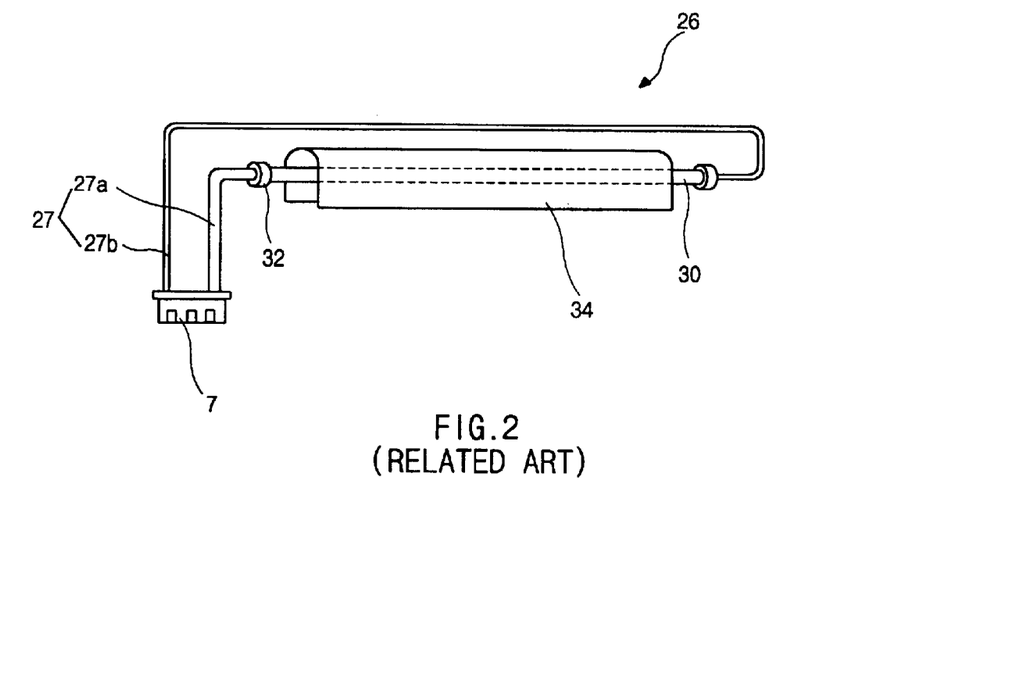
FIG. 2 is a schematic view illustrating an illuminating section having a back-light device.

FIG. 2 shows an illuminating section 26 of a back-light device, including a lamp 30. As shown, the illuminating section 26 includes the lamp 30, a lamp housing 34, wires 27, a connector 7, and a lamp holder 32. The lamp housing 34 condenses and reflects light emitted from the lamp 30. The wires 27 include a power wire 27a and a ground wire 27b that are connected to the connector 7 at one end and are soldered to the lamp 30 at the other. The lamp holder 32 covers the solder joint between the lamp 30 and the power wire 27a. Although not shown in FIG. 2, the connector 7 is connected to the inverter power supply circuit (reference element 22 of FIG. 1) such that the wires 27 supply power to the lamp 30.

Figure 3A:
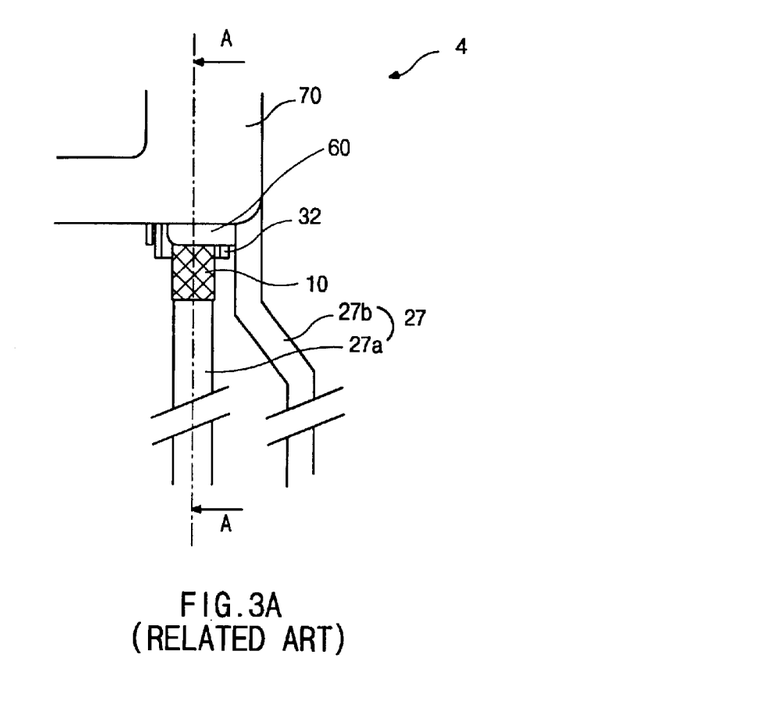
FIG. 3A is an enlarged partial view of a wire exit portion of a LCD device assembly.

FIG. 3A is an enlarged partial view of the wire exit portion of the LCD device assembly 4. As shown, a thermal shrinkage tube 10, the lamp holder 32 over the power wire 27a, the power wire 27a, and the ground wire 27b exit the right bottom side of the LCD device assembly 4. Since the length of the power wire 27a from the lamp 30 is shorter than that of the ground wire 27b, the power wire 27a is subject to more tensile forces. Therefore, the thermal shrinkage tube 10 and the lamp holder 32 cover and protect the power wire 27a. On the other hand, since the ground wire 27b is substantially longer, a thermal shrinkage tube and a lamp holder 32 are not need to protect the ground wire 27b.

Still referring to FIG. 3A, a top frame 70 and a main frame 60, which are beneficially press molded, guide the wires 27. If the wires 27 are strongly pulled when connecting the connector 7 (see FIG. 2) to the inverter power supply circuit (reference element 22 of FIG. 1), the wires 27 can be damaged by the top frame 70 and the main frame 60. This is because the top frame 70, which is metal, has an edge portion, while the main frame 60 has burrs generated during press molding. The edge and the burrs can damage the coated material of the wires 27, the thermal shrinkage tube 10, and the lamp holder 32, and can cause an open-circuit in the wires 27. Moreover, the tensile forces which occur during the fabricating process, such as connecting the connector 7 (see FIG. 2) to the inverter power supply circuit, during the conveying process, and during the packaging process, can also cause an open-circuit in the wires 27.

Figure 3B:
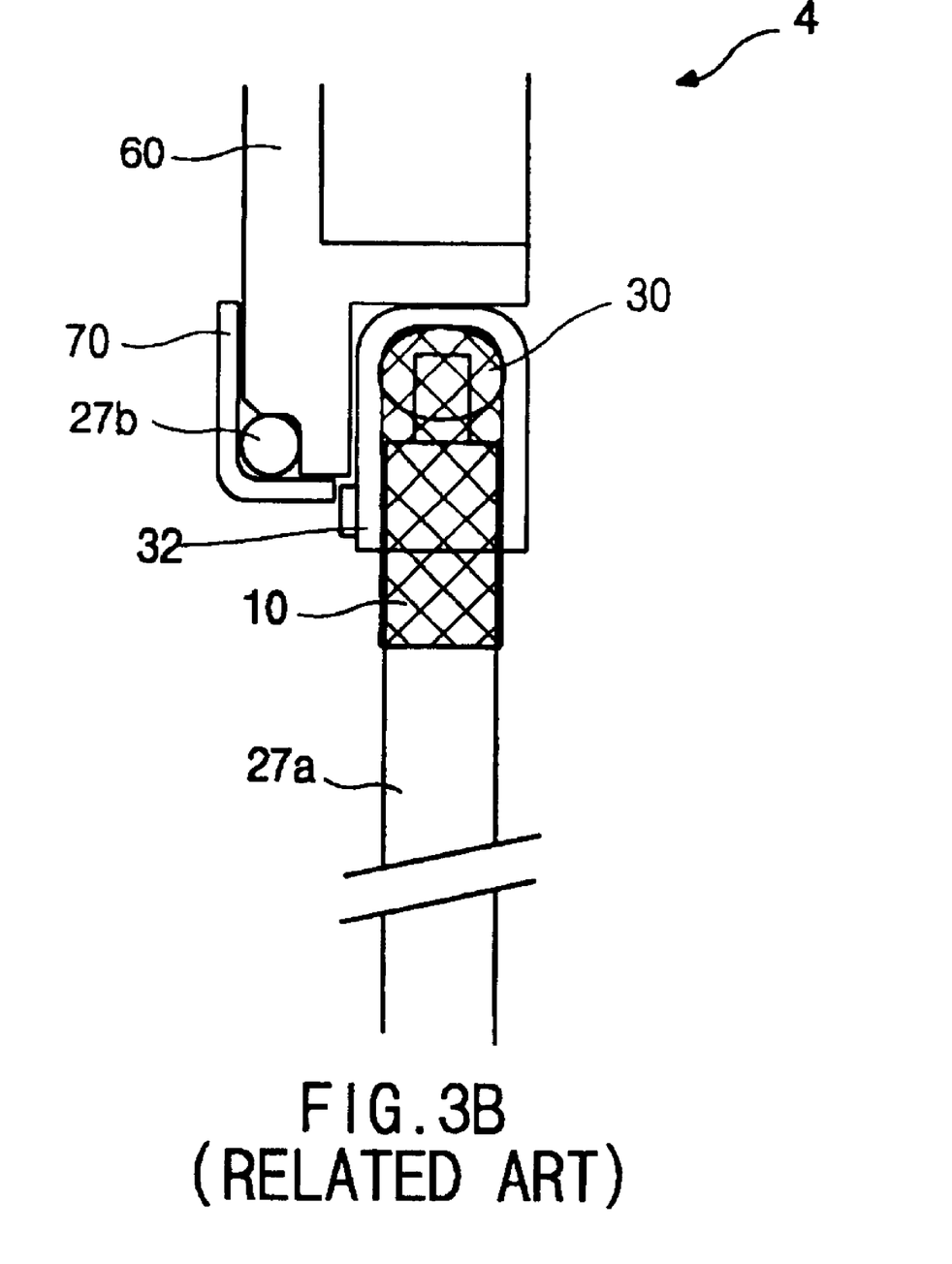
FIG. 3B is a sectional view taken along line A—A of FIG. 3A.

FIG. 3B is a sectional view taken along line A—A of FIG. 3A. As shown, the power wire 27a, which is connected to one end of the lamp 30, directly exits the LCD assembly 4. The ground wire 27b, which is connected to the other end of the lamp 30, goes through a space that is formed between the main frame 60 and the top frame 70 and then exits the LCD device assembly 4. Since the power wire 27a is shorter and is covered with the thermal shrinkage tube 10 and with the lamp holder 32, the power wire 27a is not easily bent when assembling the LCD assembly 4 and when connecting the LCD assembly 4 to the system body (reference 1 of FIG. 1). Thus, the power wire 27a touches the bottom case of the system body (reference 1 of FIG. 1) such that an assembly defect can occur.

SUMMARY OF THE INVENTION

Accordingly, the present invention is directed to a display module of the type used in a portable computer that substantially obviates one or more of the problems due to limitations and disadvantages of the related art.

An object of the present invention is to prevent an open-circuit occurring in the wires that supply power to a back-light device.

Another object of the present invention is to provide a liquid crystal display module having wires that is easily bent when connecting wires to an inverter power supply.

Additional features and advantages of the invention will be set forth in the description that follows, and in part will be apparent from that description, or may be learned by practice of the invention. The objectives and other advantages of the invention will be realized and attained by the structure particularly pointed out in the written description and claims hereof as well as shown in the appended drawings.

To achieve these and other advantages and in accordance with the purpose of the present invention, as embodied and broadly described, the present invention provides a liquid crystal display (LCD) module, including: a liquid crystal display panel having a display area; a back-light device having a lamp, wherein the lamp is connected to a power wire and to a ground wire; a first frame having first and second portions, wherein the first portion covers a top peripheral surface of the display area, and wherein the second portion covers side surfaces of the liquid crystal display panel; a second frame connected to the first frame; a bottom cover supporting the second frame and having an elongated-shape along the lamp, and a protrusion on a side wall; a wire holder guiding the power and ground wires, the wire holder coupled with the bottom cover through the protrusion; and a rib extended from the second frame and aligned to the wire holder.

The bottom cover has a first portion, two second portions, and a third portion. The first portion is parallel to the second frame and is elongated along the lamp. The two second portions are perpendicular to the first portion and are located at right and left ends of the first portion, and the third portion is perpendicular to the first and second portions and elongates along the lamp. The wire holder is in the third portion and protrudes about 10 millimeters from the third portion. The wire holder is beneficially made of PC (poly carbonate) and includes guide openings that guide the wires. Each guide opening beneficially has a U-shape.

The third portion has a protrusion that is coupled with the wire holder. The height of the protruded portion is lower than that of the third portion of the bottom cover.

Moreover, the wire holder has a slot at its central bottom portion that serves to attach the wire holder to the protrusion of the third portion of the bottom cover. The wire holder slot is formed along the third portion of the bottom cover. Beneficially, the slot is half of the height of the wire holder.

The second frame is located between the bottom cover and the first frame. The second frame has a first side portion that is parallel to the bottom cover. The second frame also has a rib that aligns to the wire holder and that extends over the wires. The rib of the second frame is beneficially made of the same material as the second frame and beneficially contacts the wire holder.

Moreover, the first frame and the bottom cover are beneficially made of a metal, possibly stainless steel (SUS).

It is to be understood that both the foregoing general description and the following detailed description are exemplary and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF ILLUSTRATED EMBODIMENTS

Reference will now be made in detail to illustrated embodiments of the present invention as shown in the accompanying drawings.

Figure 4:
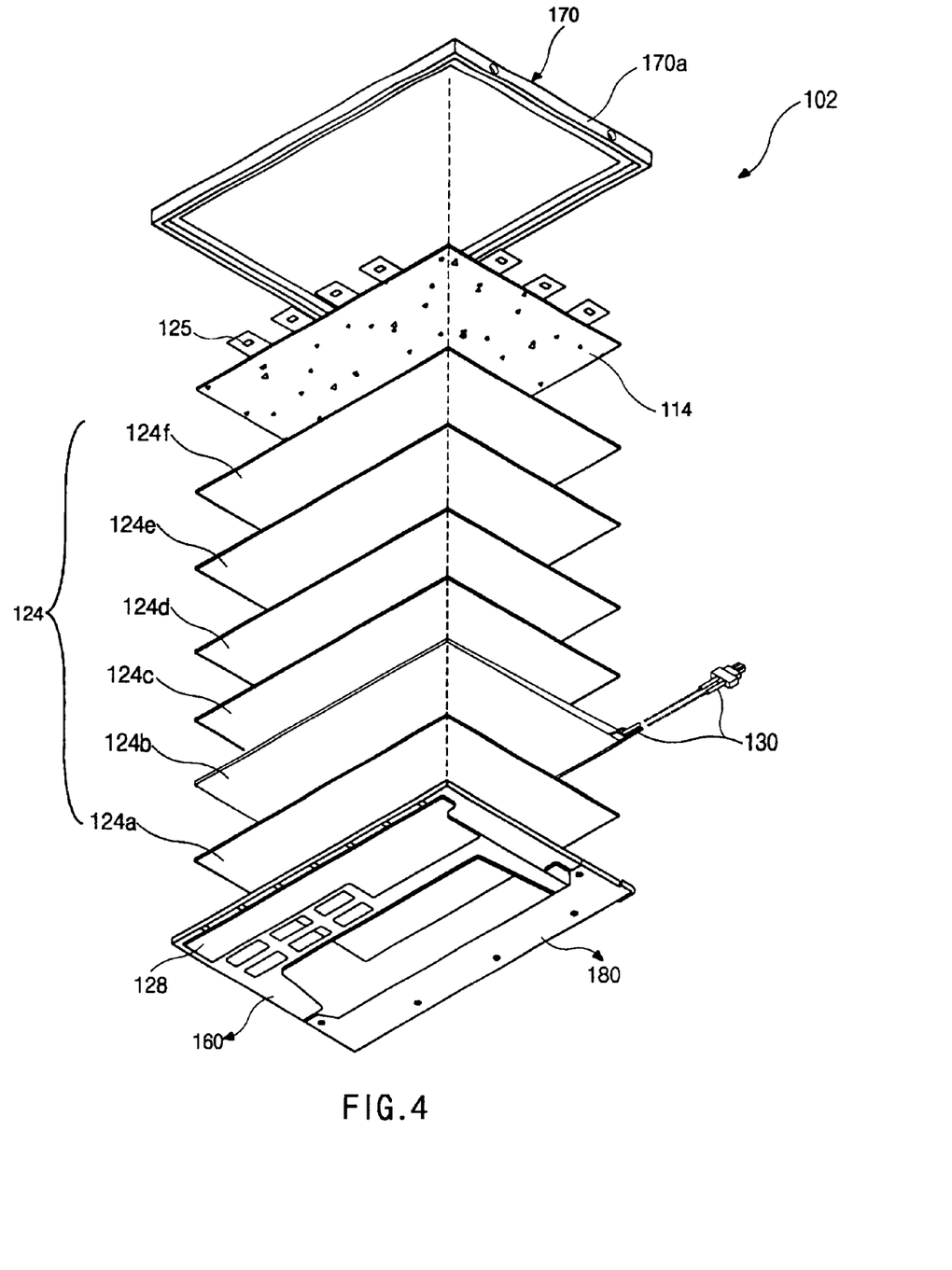
FIG. 4 is an exploded perspective view illustrating a mounting structure of a liquid crystal display module of a portable computer.

FIG. 4 is an exploded perspective view illustrating a mounting structure of a liquid crystal display module 102 of a portable computer according to the principles of the present invention. The liquid crystal display module 102 has a liquid crystal (LC) panel 114 that is connected to a printed circuit board (PCB) 128 by a flexible film 125. The liquid crystal display module further includes a back-light device 124 with a lamp 130 and top and main frames 170 and 160. Those frames retain the liquid crystal panel 114 and the back-light device 124 together. The main frame 160 is beneficially made of molded plastic and supports the back-light device 124 to a bottom cover 180. The bottom cover 180 is fixed to the main frame 160 along the lamp 130 to prevent the main frame 160 from becoming supple and wrinkled. Therefore, the bottom cover 180 is beneficially formed of material having high mechanical strength, such as stainless steel (SUS). The top frame 170 has a front surface having an opening that corresponds to a display area. The top frame 170 also has side surfaces 170a that enclose the edges of the LCD panel 114. Since the flexible film 125, such as a TAB (Tape Carrier Bonding) or a FPC (Flexible Printed Circuit), connects the PCB 128 to the liquid crystal (LC) panel 114 by being bent over the back surface of the main frame 160, the flexible film 125 can cover the periphery of the back-light device 124. Moreover, the bottom cover 180 can be formed under the flexible film 125.

Still referring to FIG. 4, the back-light device 124 comprises a reflective sheet 124a, a light guide plate 124b, a first diffuser/protecting sheet 124c, a first prism sheet 124d, a second prism sheet 124e, and a second diffuser/protecting sheet 124f, which are layered in that order. Moreover, the flexible film 125 can also cover the peripheral portion of the main frame 160 after being bent, and thus the flexible film 125 can be covered by another bottom cover (not shown). Finally, the top frame 170 is combined with the aforementioned back-light device 124, with the main frame 160, and with the bottom cover 180.

The lamp 30 is usually a cold cathode fluorescent lamp (CCFL), a heat cathode fluorescent lamp (HCFL), or the like. The lamp 30 can be a direct back light unit or an edge light unit.

A direct back light source generally reflects light from a light source onto the back surface of a liquid crystal panel using a reflective sheet, and diffuses its output light using a diffuser sheet that is disposed such that the shape of the light source cannot be identified by human eyes. Electro luminescence (EL) is usually used in a direct back light. However, the direct back light has some problems, such as being relatively thick, consuming significant power, and having a high unit cost.

An edge light unit device receives light through one side of a plate-shaped light guide comprised of a transparent acryl resin or the like. The edge light unit directs the received light to a light outputting surface of the light guide plate that then illuminates the back of a liquid crystal panel. In order to improve light efficiency, an optical reflective sheet, or an optical reflective film, is often provided on the opposite side of the light output surface of the light guide plate. To make the light output uniform, a light diffuser sheet is often provided at the light output surface of the light guide plate. A CCFL (cold cathode fluorescent lamp) is usually used with edge light units. A CCFL is thin, lightweight, and consumes little power, and thus is highly suitable for portable computers. Therefore, what follows is explained with reference to an edge light units.

Figure 5A:
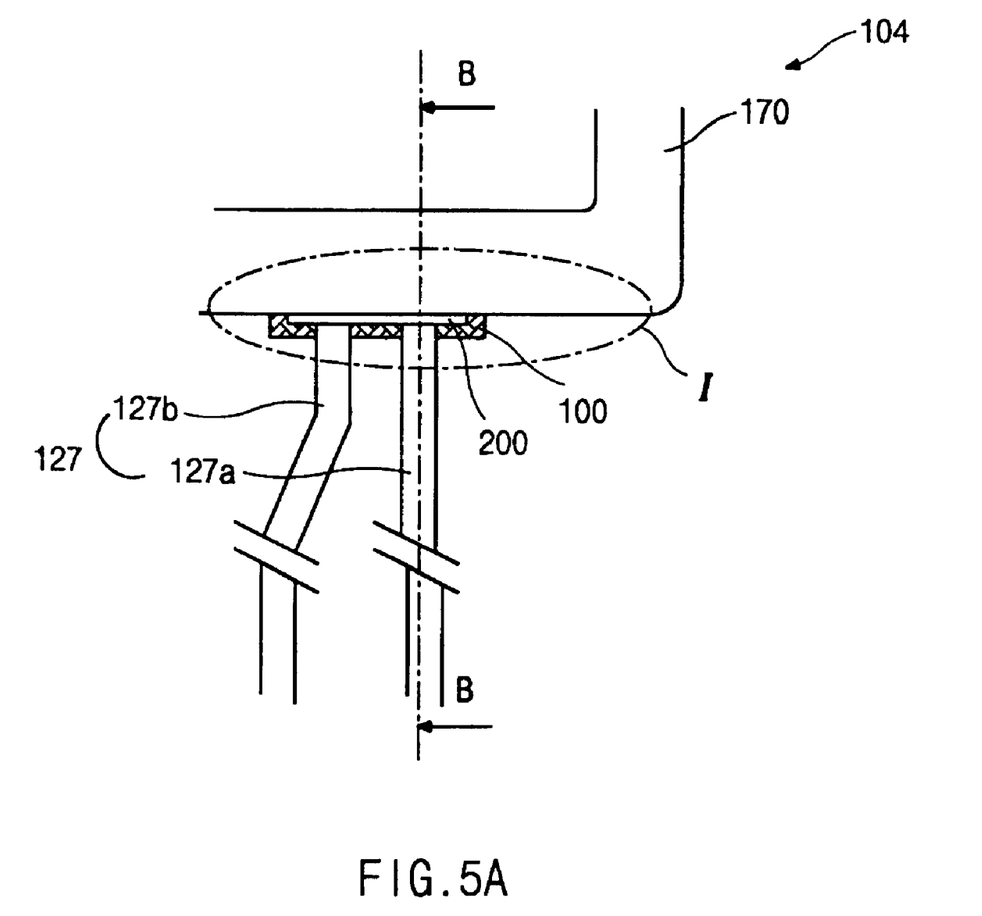
FIG. 5A is an enlarged partial plan view of a wire exit portion of an LCD device assembly according to an embodiment of the present invention.
Figure 5B:
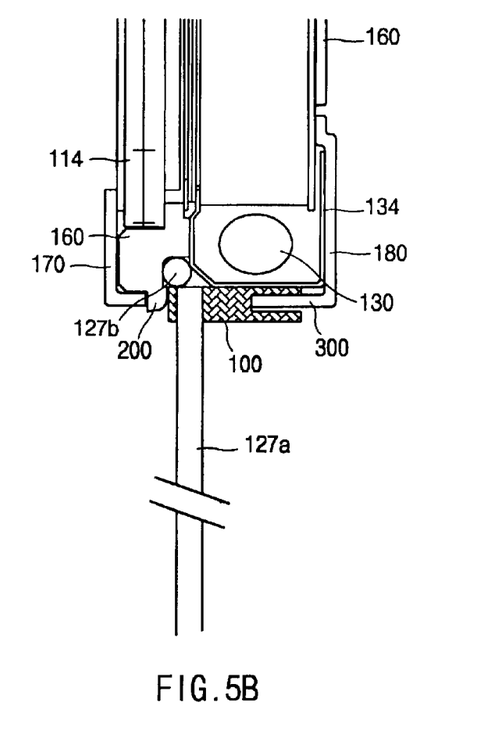
FIG. 5B is a sectional view taken along line B—B of FIG. 5A.
Figure 5C:
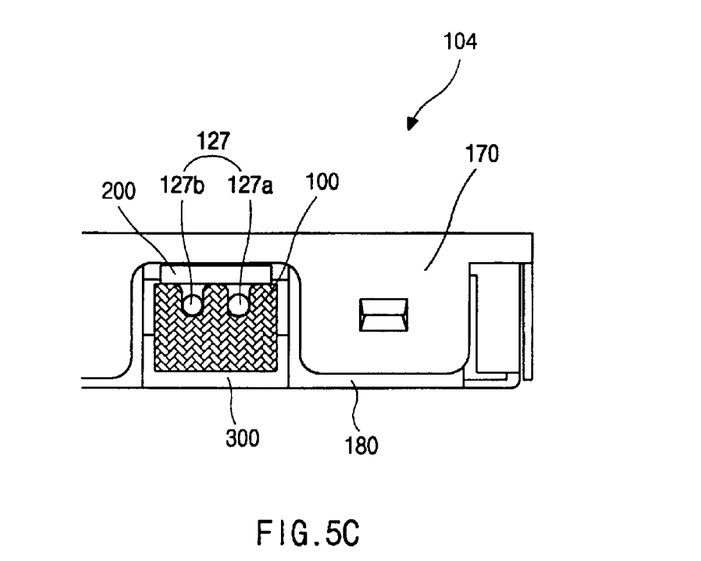
FIG. 5C is an enlarged front view illustrating a portion "I" of FIG. 5A.

Refer now to FIGS. 5A to 5C for views of a wire exit portion of a LCD device assembly according to an embodiment of the present invention. FIG. 5A is an enlarged partial plan view of a wire exit portion of a LCD device assembly according to the principles of the present invention. FIG. 5B is a sectional view taken along line B—B of FIG. 5A. FIG. 5C is an enlarged front view illustrating a portion "I" of FIG. 5A. As some aspects of the figures were previously explained with reference to FIGS. 1 and 2, those aspects may not be repeated.

As shown in FIGS. 5A to 5C, wires 127 come out of a LCD module 104 in its right bottom portion. The wires 127 include a power wire 127a, which is connected to one end of a lamp 130, and a ground wire 127b, which is connected to the other end of the lamp 130. A main frame 160 has a rib 200 that protrudes from the main frame 160 in the longitudinal direction of the wire 127a at the wire exit portion so that the rib 200 projects to the side surface of the top frame 170. The main frame 160 supports the liquid crystal panel 114. The wires 127 pass through a space between a lamp housing 134 and the main frame 160, and then the wires 127 come out the wire exit portion of the LCD module 104.

Moreover, the lamp 130 is arranged inside the lamp housing 134. A top frame 170 fixes the liquid crystal panel 114 and the back-light unit to the main frame 160 and to a bottom cover 180. The bottom cover 180 has a protrusion 300 that couples to a wire holder 100 having guide openings at its top portion that holds the wires 127. The wire holder 100 protrudes from a side wall of the bottom cover 180 by about 10 millimeters. The guide openings of the wire holder 100 and the rib 200 of the main frame 160 retain the wires 127.

Accordingly, the wires 127 are bound by the wire holder 100 and by the rib 200, which are made of plastic material. Thus, the wires 127 do not touch the top frame 170 and the bottom cover 180, even if the wires 127 are strongly pulled (as when connecting the connector 7 [of FIG. 2] to the inverter power supply circuit 22 [of FIG. 1]). Therefore, an open caused by edges or burrs of the top frame 170 or of the bottom cover 180 is prevented, even if the top frame 170 and the bottom cover 180 are made of metal have sharp edges. Moreover, since the wire holder 100 guides the wires 127, the thermal shrinkage tube and the lamp holder (reference elements 10 and 32 of FIG. 3A) are not required to protect the wires. Therefore, the wires 127 are readily bent when connecting the wires 127 to the inverter power supply and when assembling the LCD module to the system body (reference element 1 of FIG. 1).

Still referring to FIGS. 5A to 5C, the diameter of the power wire 127a is beneficially about 1.08 millimeters, and the power wire 127a is beneficially made of a flexible material. The wire holder 100 is beneficially formed from a heat-resistant, acid-resistant, and light-resistant PC (poly carbonate). PC (poly carbonate) is also a hard, insulating substance.

Figure 6A:
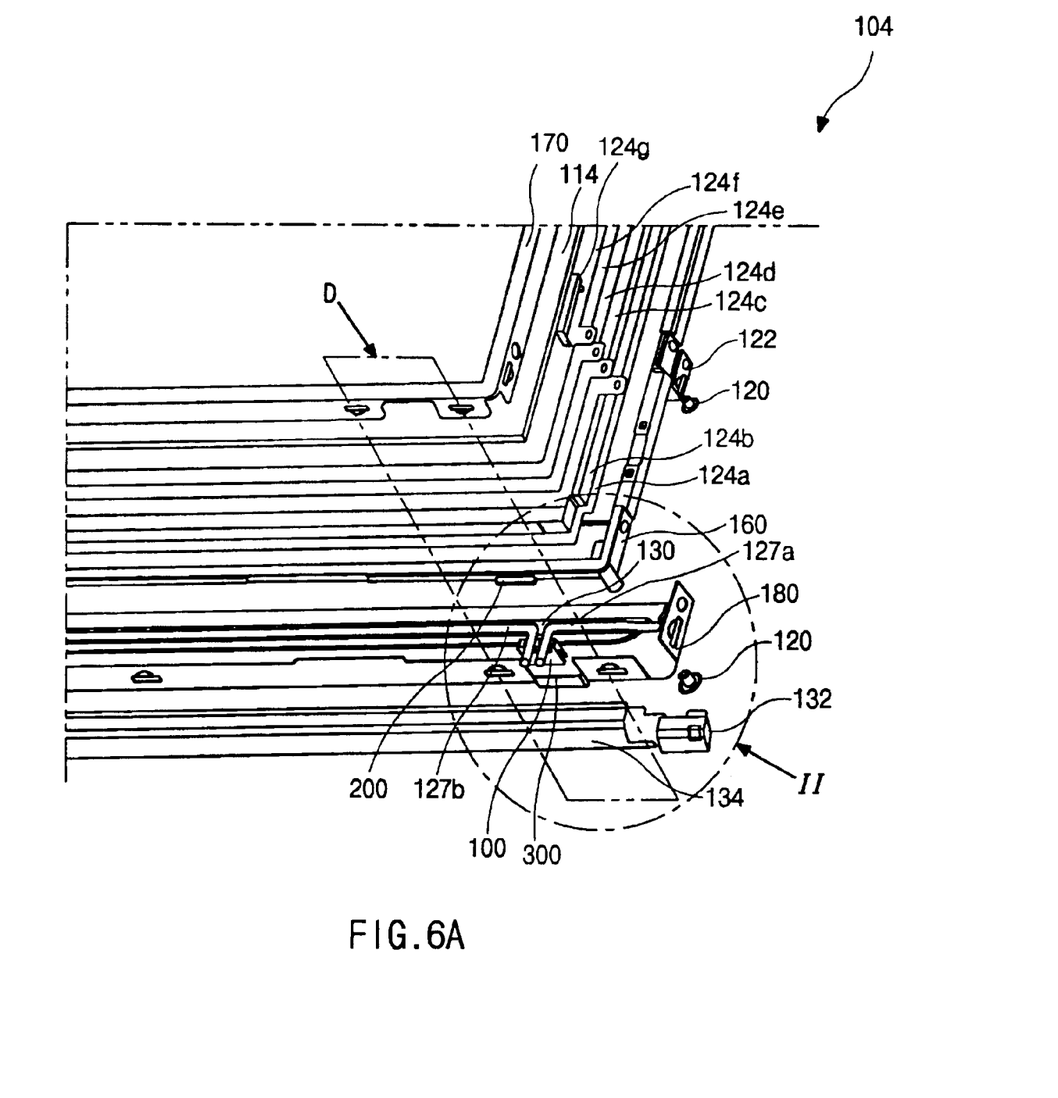
FIG. 6A is an exploded perspective view of a liquid crystal display module according to the principles of the present invention.

The assembly order of the liquid crystal display module will now be explained. Refer to FIG. 6A for an exploded perspective view of a liquid crystal display module according to the principles of the present invention. First, the wires 127 (power wire 127a and ground wire 127b) are separately connected to each end of the lamp 130 in the lamp housing 134 having lamp holders 132 at each end. The lamp 130, wires 127, and the lamp housing 134 with the lamp holders 132 are then assembled in the bottom cover 180. At this time the wire holder 100 is mated with the protrusion 300 of the bottom cover 180. The wires 127 are arranged in the U-shaped guide openings of the wire holder 100. After that, the bottom cover 180 with the lamp housing 134 and the lamp 130 is joined to the main frame 160 by screws 120. The wire holder 100, as shown in FIG. 6A, aligns with the rib 200 of the main frame 160.

Still referring to FIG. 6A, a reflective sheet 124a, a light guide plate 124b, a first diffuser/protecting sheet 124c, a first prism sheet 124d, a second prism sheet 124e, a second diffuser/protecting sheet 124f, a guide sheet 124g and the LC panel 114 are layered in this order. Moreover, the LC panel 114 has a display area and a flexible film (not shown). The flexible film (not shown) can cover the back surface of the peripheral portion of the main frame 160. Then, a ground plate 122 is screwed into the main frame 160 using a screw 120. Finally, the top frame 170 is assembled to the main frame 160, and thus the LCD module 104 is complete. The top frame 170 has a first portion, which covers the periphery of the top surface of the LC panel 114, and a second portion, which covers the side surfaces of the LCD panel 114.

Still referring to FIG. 6A, the letter "D" denotes a dotted rhombus area that shows the wire exit portion of the LCD module 104. As shown, the wire holder 100 has a means of guiding the wires 127 in the wire exit portion of the LCD module 104. Thus, a thermal shrinkage tube and a lamp holder are not necessary in the wire exit portion of the LCD module 104. Moreover, because of the rib 200 and the wire holder 100, the wires 127 are prevented from directly contacting the top frame 170 and the bottom cover 180, and thus an open caused by edges or burrs of the top frame 170 and/or of the bottom cover 180 does not occur. To ensure proper assembly and to hold the wires 127, the protrusion 300 of the bottom cover 180 is mated with the wire holder 100.

Figure 6B:
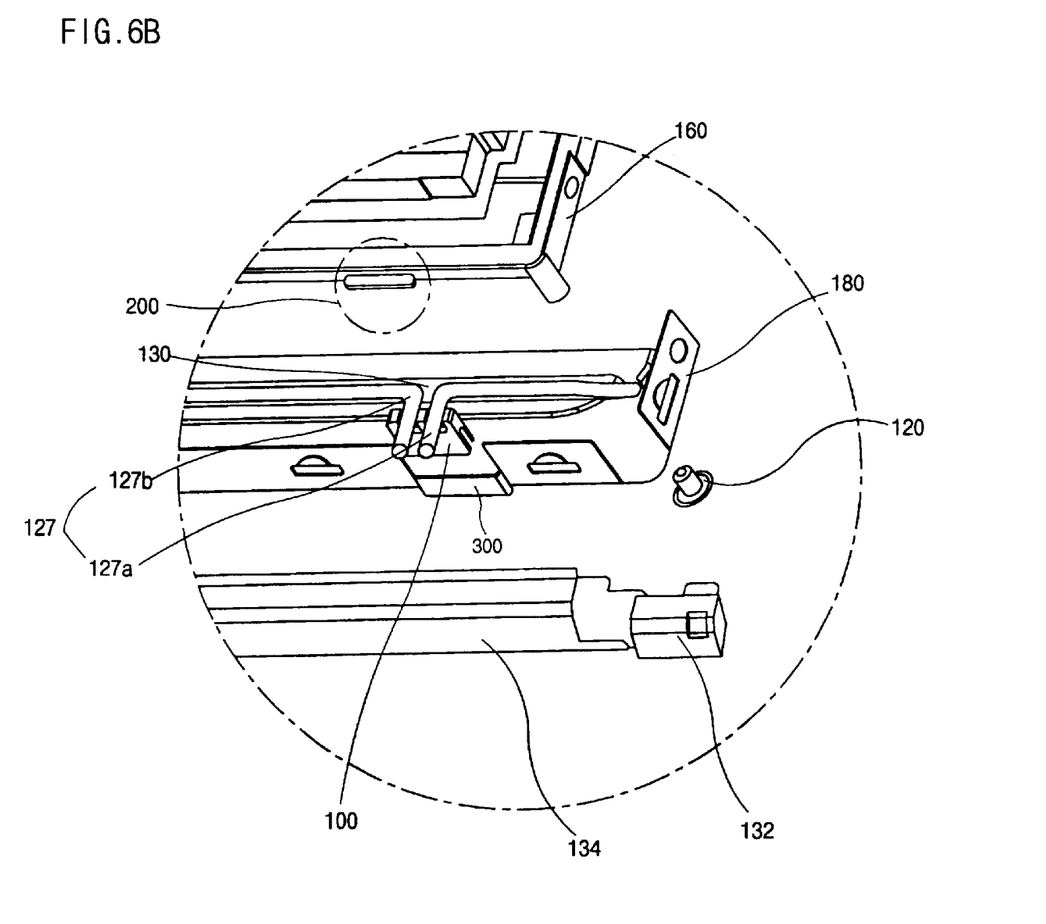
FIG. 6B is an enlarged view illustrating a portion "II" of FIG. 6A.

FIG. 6B, an enlarged view illustrating a portion "II" of FIG. 6A, shows a process of fixing the wire holder 100 to the bottom cover 180. To fix the wire holder 100 to the bottom cover 180, the wire holder 100 has a slit H (see FIG. 6C) at its central bottom portion and the bottom cover 180 has a protrusion 300 at its side wall portion. The protrusion 300 is mated to the slit H. The protrusion 300 projects from the rest of the side wall portion of the bottom cover 180 by about half of the thickness of the wire holder 100. This prevents the wire holder 100 from contacting the back-light unit and from sliding from side to side. As described above, the lamp 130, the wires 127, and the lamp housing 134 with the lamp holder 132 are assembled on the bottom cover 180. Further, the assembled bottom cover 180 is fixed to the main frame 160 by the screws 120. As the main frame 160 has the rib 200 that is aligned with the wire holder 100, the rib 200 prevents the wires 127 from directly contacting the top frame 170, again to avoid an open circuit in the wires 127. Although not shown, if desired a thermal shrinkage tube can encircle the wires 127, except at the wire exit portion.

Figure 6C:
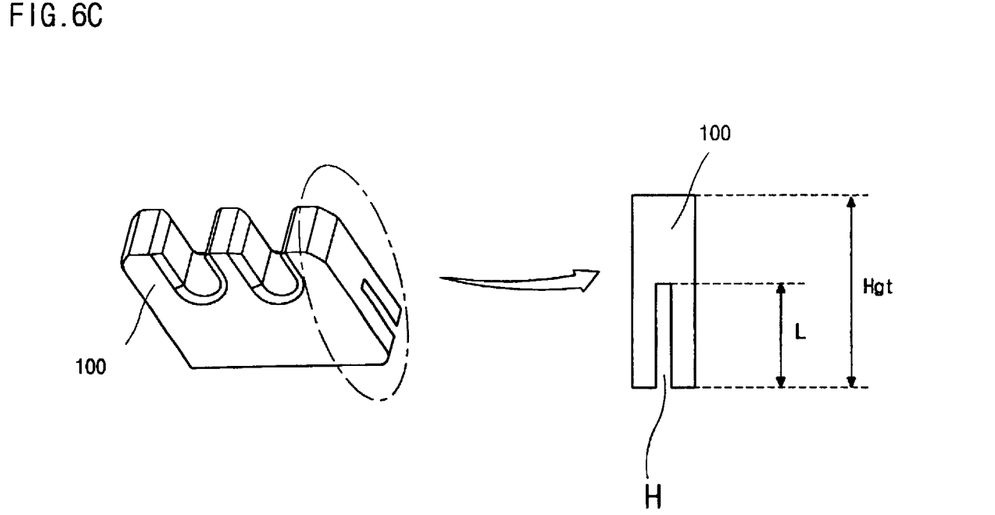
FIG. 6C is a perspective view of a wire holder according to the principles of the present invention.

FIG. 6C shows both a perspective view and a side view of a wire holder 100 according to the principles of the present invention. The wire holder 100 includes the slit "H" (previously mentioned) at its central bottom portion that is used to couple to the protrusion 300 of the bottom cover 180. Beneficially, the shape of the slit "H" depends on the thickness, length, and shape of the protrusion 300. To fix the height of the wire holder 100 to that of the side wall portion of the bottom cover 180 when the wire holder 100 is on the protrusion 300, the height "Hgt" of the wire holder 100 is beneficially equal to that of the side wall portion of the bottom cover 180. Furthermore, the depth "L" of the slit "H" is beneficially half of the height "Hgt" of the wire holder 100, and the height of the protrusion 300 of the bottom cover 180 is beneficially half of the height of the side wall portion of the bottom cover 180. Accordingly, when assembling the elements of the LCD module 104 (see FIG. 6A), the main and top frames 160 and 170 are fastened to each other with the bottom cover 180 fixed to the back surface of the main frame 160. It is important to adjust the heights "L" and "Hgt" of the wire holder 100.

Figure 6D:
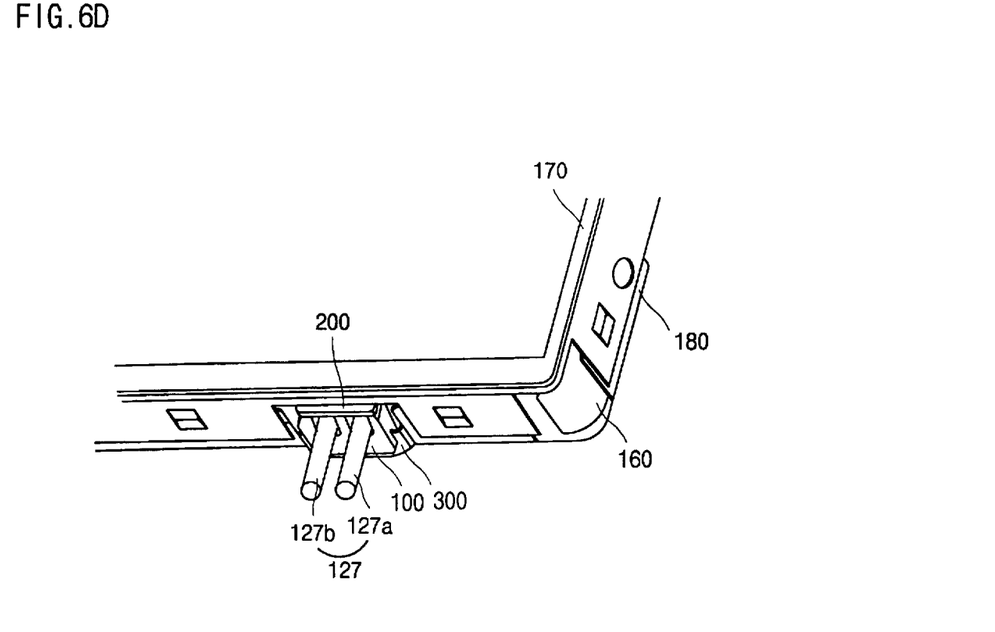
FIG. 6D is an enlarged perspective view illustrating a portion "D" of FIG.

FIG. 6D is an enlarged perspective view illustrating the portion "D" of FIG. 6A after complete assembly of the liquid crystal display module. The elements of FIG. 6D will be compared to those of FIG. 3A (conventional art). Referring now to FIG. 3A, since the power wire 27a is surrounded by the thermal shrinkage tube 10 and by the lamp holder 32, that wire is not easily bent when connecting the wires 27 to the inverter power supply. However, the embodiment shown in FIG. 6D adopts the wire holder 100 and the rib 200 that retain the wires 127, thus the wires 127 are protected and are easy to bend when connecting the wires 127 to the inverter power supply. Accordingly, with the embodiment shown in FIG. 6D the process of connecting the wires 127 to the inverter power supply is easily performed and reduces product defects.

Still comparing FIG. 6D to FIG. 3A, because the wires 27 of FIG. 3A directly contact the top frame 70 and the main frame 60, the coated material (insulation) of the wires 27 is easily damaged by the top frame 70, which is made of metal. However, the wire holder 100 and the rib 200 of FIG. 6D prevent the wires 127 from directly contacting the top frame 170 and the bottom cover 180, and thus the wires 127 are not easily damaged and open-circuited.

Furthermore, in different embodiments of the present invention wire exit portions of the LCD module can be formed at both right and left bottom sides of the LCD module. This is particularly beneficial in large LCD modules that can have lamps at both the right and the left sides. Of course, there can be more than two wire exit portions.

The illustrated embodiment of the invention has the following advantages.

First, since the wires come out of the LCD module through the guide openings of the wire holder, the wires do not directly contact the top frame and the bottom cover. Thus, open-circuits are reduced or prevented.

Second, because of the wire holder, the thermal shrinkage tube and the lamp holder are not required at the wire exit portion. Thus the wires are easily bent when connecting the wires to the inverter power supply. Moreover, the LCD module is more easily assembled and with fewer defects.

Third, due to reducing tensile forces on the wires during assembling (or the like), open-circuits are reduced or prevented.

Fourth, since the wire holder is coupled with the bottom cover, the wire holder does not affect a thickness of the LCD module.

Other embodiments of the invention will be apparent to the skilled in the art from consideration of the specification and practice of the invention disclosed herein. For example, details of the cases that hold the various elements, such as the display assembly, can vary. It is intended that the specification and examples be considered as exemplary only, with the true scope and spirit of the invention being indicated by the following claims.

What is claimed is:

1. A display module, comprising:
   a display panel having a display area and side surfaces;
   a back-light device having a lamp connected to a power wire and to a ground wire;
   a first frame having first and second portions, wherein the first portion covers a top peripheral surface of the display area, and wherein the second portion covers the side surfaces;
   a second frame holding the lamp and coupled to the first frame;
   a bottom cover fixed to the second frame, the bottom cover having an elongated-shape along the lamp and having a protrusion at a side wall portion;
   a wire holder guiding the power and ground wires, the wire holder coupled with the bottom cover at the protrusion; and
   a rib extended from the second frame and aligned with the wire holder.

2. A display module according to claim 1, wherein the bottom cover has a first portion, second portions, and a third portion, wherein the first portion of the bottom cover is parallel to the second frame and elongated along the lamp, wherein the second portions of the bottom cover are perpendicular to the first portion of the bottom cover and located at right and left ends of the first portion of the bottom cover, and wherein the third portion of the bottom cover is perpendicular to the first and second portions of the bottom cover and elongated along the lamp.

3. A display module according to claim 1, wherein the wire holder is made of PC (poly carbonate).

4. A display module according to claim 1, wherein the wire holder has guide openings that guide the wires.

5. A display module according to claim 1, wherein the second frame is located between the bottom cover and the first frame, wherein the second frame has a first side portion that is parallel to the bottom cover, and wherein the rib extends over the power and ground wires.

6. A display module according to claim 1, wherein the rib is comprised of the same material as the second frame.

7. A display module according to claim 1, wherein the rib contacts the wire holder.

8. A display module according to claim 1, wherein the first frame and the bottom cover include metal.

9. A display module according to claim 1, wherein the display panel includes a liquid crystal.

10. A display module according to claim 1, wherein the rib contacts the wire holder and extends over the power and ground wires.

11. A display module according to claim 2, wherein the wire holder mates with the third portion of the bottom cover.

12. A display module according to claim 2, wherein the third portion of the bottom cover has a protrusion that mates with the wire holder.

13. A display module according to claim 4, wherein each of the guide openings has a U-shape.

14. A display module according to claim 8, wherein the metal includes stainless steel.

15. A display module according to claim 11, wherein the wire holder protrudes about 10 millimeters from the third portion of the bottom cover.

16. A display module according to claim 12, wherein the protrusion of the third portion of the bottom cover protrudes outward from the third portion of the bottom cover.

17. A display module according to claim 12, wherein a height of the protrusion of the third portion is less than that of the rest of the third portion.

18. A display module according to claim 12, wherein the wire holder has a slit at its central bottom portion that mates with the protrusion of the third portion.

19. A display module according to claim 18, wherein the slit is formed along the third portion.

20. A display module according to claim 19, a depth of the slit is about half of a height o f the wire holder.

21. A display module, comprising:

a display assembly;

a lamp connected to a plurality of wires;

a case holding said display assembly and said lamp, said case having an opening with a protrusion; and a wire guide having a front surface, a back surface, a left side, a right side, a top and a bottom, wherein a slit extends from said right side to said left side, and wherein said top joins with a plurality of openings that extend from said front side to said back side;

wherein said slit mates with said protrusion, and wherein said plurality of wires pass between an inside of said case and an outside of said case by passing through said plurality of openings.

22. A display module according to claim 21, wherein said case further includes a rib that contacts the top of said wire guide, and wherein said wire guide and said rib retain sad plurality of wires in said plurality of openings.

23. A display module according to claim 21, wherein said display assembly includes a liquid crystal display.

24. A display module according to claim 21, further including a back-light assembly.

25. A display module according to claim 21, wherein said wire guide includes plastic.

26. A display module according to claim 21, wherein said slit extends about half way between said bottom and said top.

27. A display module according to claim 21, wherein said plurality of openings are dimensioned to retain said plurality of wires.

28. A display module according to claim 21, wherein said plurality of openings are U-shaped.

29. A display module according to claim 21, wherein said case includes a metallic member, and wherein said wire guide and said rib prevents contact of said plurality of wires as they pass between the inside of said case and the outside of said case.

30. A display module according to claim 24, wherein said back-light assembly includes the lamp.

31. A computer system, including:

a display assembly;

a lamp connected to a plurality of wires;

a first case holding said display assembly and said lamp, said first case having an opening with a protrusion; and a wire guide having a front surface, a back surface, a left side, a right side, a top and a bottom, wherein a slit extends from said right side to said left side, and wherein said top joins with a plurality of openings that extend from said front side to said back side;

wherein said slit mates with said protrusion, and wherein said plurality of wires pass between an inside of said first case and an outside of said first case by passing through said openings.

32. A computer system according to claim 31, wherein said first case further includes a rib that contacts the top of said wire guide, and wherein said wire guide and said rib retain said plurality of wires in said plurality of openings.

33. A computer system according to claim 31, wherein said display assembly includes a liquid crystal display.

34. A computer system according to claim 31, further including a back-light assembly.

35. A computer system according to claim 31, wherein said wire guide includes plastic.

36. A computer system according to claim 31, wherein said slit extends about half way between said bottom and said top.

37. A computer system according to claim 31, wherein said plurality of openings are dimensioned to retain said plurality of wires.

38. A computer system according to claim 31, wherein said plurality of openings are U-shaped.

39. A computer system according to claim 31, wherein said first case includes a metallic member, and wherein said wire guide and said rib prevents contact of said plurality of wires as they pass between the inside of said first case and the outside of said first case.

40. A computer system according to claim 31, further including a second case attached to said first case.

41. A computer system according to claim 34, wherein said back-light assembly includes the lamp.

42. A computer system according to claim 40, wherein said second case is attached to said first case by a hinge.

43. A computer system according to claim 40, wherein said second case holds a keyboard.

44. A computer system according to claim 40, wherein said second case holds an inverter power supply.

45. A computer system according to claim 44, wherein said plurality of wires connect to said inverter power supply.

* * * * *